March 26, 1963  A. F. DEMING ETAL  3,083,326
TRANSISTOR MOTOR CIRCUIT
Filed March 18, 1959

INVENTORS
ANDREW F. DEMING
BY EMMOR V. SCHNEIDER

Woodling and Krost,
attys.

United States Patent Office 3,083,326
Patented Mar. 26, 1963

3,083,326
TRANSISTOR MOTOR CIRCUIT
Andrew F. Deming and Emmor V. Schneider, Alliance, Ohio, assignors to Consolidated Electronics Industries Corporation, a corporation of Delaware
Filed Mar. 18, 1959, Ser. No. 800,292
1 Claim. (Cl. 318—138)

The invention relates in general to motor circuits incorporating transistors and more particularly to an induction motor driven from and at the frequency of operation of a transistor circuit.

An object of the invention is to provide a direct current energization circuit for an alternating current motor.

Another object of the invention is to provide a transistor circuit for energizing an induction motor.

Another object of the invention is to provide an induction motor driven from a push-pull circuit derived from transistors and with a feedback from the motor to control the frequency of conduction of the transistors.

Another object of the invention is to provide a transistor motor circuit with an alternating magnetomotive force established in the core of an induction motor and with a resonant feedback means deriving a voltage in accordance with this alternating magnetomotive force to control a transistor circuit energizing the motor.

Another object of the invention is to provide a variable speed squirrel cage induction motor.

Another object of the invention is to provide a readily available small high speed squirrel cage induction motor operating at speeds in excess of speeds obtainable by operation from commercially available alternating voltage sources.

Another object of the invention is to provide a motor control circuit which has fairly constant speed regardless of input voltage.

Other objects and a fuller understanding of this invention may be had by referring to the following description and claim, taken in conjunction with the accompanying drawing, in which:

Figure 1:
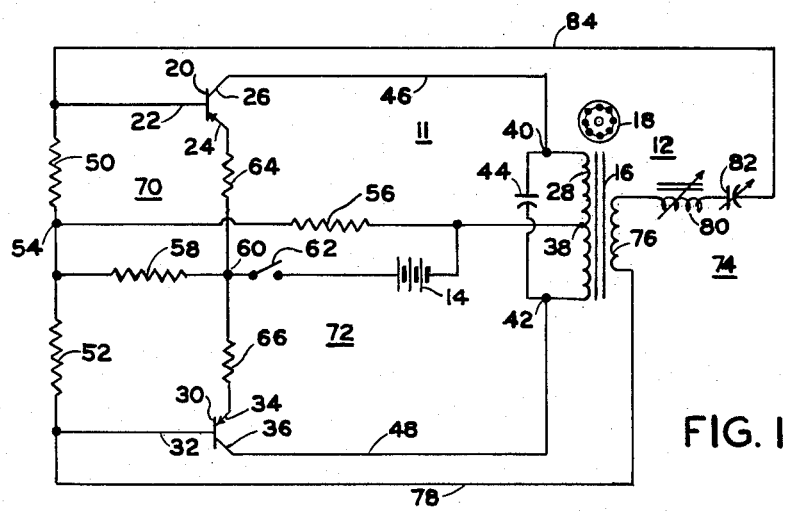
FIGURE 1 is a schematic diagram of a circuit embodying the invention.

FIGURE 1 shows schematically a transistor motor circuit 11 including generally an induction motor 12, transistors 20 and 30 and a voltage source 14. The voltage source is a direct current source illustrated as a battery and the induction motor 12 has a core 16 and a rotor 18. The induction motor 12 is a subfractional horsepower single phase squirrel cage shaded pole induction motor which, because of the shaded poles, is a unidirectional motor. The transistor 20 has base, emitter and collector electrodes 22, 24 and 26, respectively, and similarly the transistor 30 has base, emitter and collector electrodes 32, 34 and 36, respectively. The induction motor core 16 carries a primary winding 28 which has a center tap 38 and end connections 40 and 42. The upper and lower halves of the winding 28 may be considered as first and second windings on the primary of the motor 12.

A capacitor 44 is connected across the end connections 40 and 42. A conductor 46 connects the collector 26 to the end connection 40 and a conductor 48 connects the collector 36 to the end connection 42. The base electrodes 22 and 32 are connected together by first and second resistors 50 and 52, with a terminal 54 therebetween. A third resistor 56 interconnects the terminal 54 and the center tap 38. A fourth resistor 58 is connected from the terminal 54 to a terminal 60 and thence through a switch 62 to the positive terminal of the D.C. source 14. The negative terminal of this source 14 is connected to the center tap 38. A resistor 64 interconnects the emitter 24 and the terminal 60 and a resistor 66 interconnects the emitter 34 and the terminal 60.

The transistors 20 and 30 are shown as PNP type transistors, or N type transistors, and are connected in a common emitter form of circuit. The bases 22 and 32 and emitters 24 and 34 are connected in an input circuit 70 and the emitters 24 and 34 and collectors 26 and 36 are connected in an output circuit 72. The primary winding 28 and the voltage source 14 are also connected in this output circuit 72.

A feedback circuit 74 includes a second control winding 76 on the core 16 and has one end connected by a conductor 78 to the base 32. The other end of the control winding 76 is connected through an inductor 80, a capacitor 82 and a conductor 84 to the base 22. The feedback circuit 74 applies an alternating voltage to the resistors 50 and 52, which are a part of the input circuit 70.

The resistors 50 and 52 not only establish an alternating voltage input to the input circuit 70 but also maintain stability of operation of the two transistors 20 and 30. The resistor 58 is in the circuit between the base and emitter of each transistor; hence, it determines the base to emitter bias. To this end the resistor 56 preferably has a much higher impedance than the resistor 58, and therefore the resistor 58 in combination with resistor 56 form a bias circuit to establish a very slight negative bias on the bases 22 and 32 which tends to establish the transistors in a conductive state. The resistors 64 and 66 are preferably of quite low value and assure equilibrium of operation of the circuit and are in the nature of current limiting resistors.

In operation, the entire motor circuit 11 tends to oscillate, and any slight unbalance in the circuit as between the two transistors will cause one or the other of the transistors 20 and 30 to go into a conductive state when the switch 62 is closed. It does not matter which transistor commences conduction first but when conduction does start, for example in the transistor 20, the emitter to collector current from the D.C. source 14 establishes a current flow through the upper half of the primary winding 28. By transformer action this pulse of current establishes a current pulse in the control winding 76, and the feedback circuit 74 is selected to be resonant to the desired operating frequency. In a motor operated in accordance with this invention, this frequency of operation was chosen to be about 120 cycles. The feedback circuit 74 is shown as a series resonant circuit including the inductance of the winding 76 and the inductor 80 plus the capacitance of the capacitor 82. The entire inductance could be provided in the control winding 76, nevertheless, by separating the two functions thereof the Q of the circuit may be raised. A value of .9 henry for inductor 80 and a value of 2.0 microfarads for capacitor 82 establish a resonant circuit resonant at about 120 cycles. Either or both the inductor 80 and capacitor 82 may be made variable to vary the frequency and hence the speed of operation.

The pulse of current in the feedback circuit 74 makes it pass a voltage at the operating frequency to the resistors 50 and 52 which act as a load for this feedback voltage. When the voltage is positive at base 22 this will cut off the transistor 20 and simultaneously the feedback voltage will be negative at base 32 to establish conduction of the transistor 30. Accordingly, a pulse of current will be passed from the D.C. source 14 through the emitter 34 and collector 36 to the lower half of the primary winding 28. This is a voltage applied to the primary winding 28 in the opposite sense to that applied by transistor 20; hence, the output circuit 72 is a push-pull circuit and establishes an alternating voltage in the primary winding 28 and; hence, establishes an alternating magnetomotive force in the core 16. This alternating voltage is at the operating frequency and; hence, by transformer action the control winding 76 receives this alternating voltage and the resonant circuit elements 80 and 82 of this feedback circuit 74 maintain this operating frequency substantially constant.

The capacitor 44 is not intended to resonate at this operating frequency, rather it is intended to improve the form of the voltage applied to the primary winding 28. The push-pull resonant circuit 72 essentially passes a square wave current pulse from the alternately conducting transistors 20 and 30, and this capacitor 44 is chosen to be of large enough capacity to substantially transform this square wave into a sine wave. This eliminates some of the odd harmonic frequencies and; hence, improves the stability of operation. With the values shown for the other circuit elements this capacitor 44 may be about 100 microfarads.

The battery 14 may be normally a 12 volt battery and in many cases such as automotive use a 12 volt storage battery varies from 12 to 15 volts depending upon the state of charge or discharge thereof.

Figure 2:
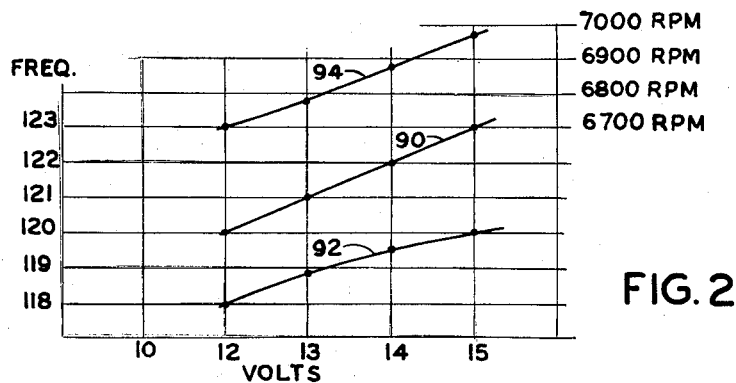
FIGURE 2 is a graph of frequency and speed curves versus voltage.

FIGURE 2 shows a curve 90 of frequency versus voltage at no load on the motor. This FIGURE 2 also shows a curve 92 of frequency versus voltage at locked rotor. Both of these curves are relatively flat and show that the frequency of operation does not vary appreciably for even 25% variation in input voltage. Additionally, FIGURE 2 shows a curve 94 of speed versus input voltage at no load and this curve 94 shows that the speed varies only approximately 2½% despite a 25% variation in input voltage. A comparison of the curves 90 and 92, of frequency versus volts for no load and locked rotor, shows that the frequency does not drop appreciably for wide variations in load, even the maximum variation of from no load to locked rotor. The variation in frequency of operation shown is less than 3% throughout the entire voltage range.

By varying the value of the inductor 80 or of the capacitor 82 the frequency of operation of the motor and hence its speed may be changed for this motor, which basically is intended for operation at 120 cycles, from a low of 60 cycles to a high of 185 cycles. By raising the voltage applied to the transistors this adjustment range has been found to be even greater.

This same motor may operate at a frequency of operation lower than 60 cycles, by increasing the total inductive reactance in the feedback circuit 74, hence the motor easily achieves a 3 to 1 or 4 to 1 speed range. The motor may also operate at frequencies higher than 185 cycles by increasing the capacitive reactance in the feedback circuit 74, and if still higher speeds are desired, the motor may be changed to operate more efficiently at higher speeds by using thinner laminations for the core, a higher rotor resistance and by making appropriate shading coil changes.

The control winding 76 is a means to obtain a voltage dependent on the alternating voltage applied to the primary winding 28 and; hence, in accordance with the alternating flux in the core 16. This in turn is dependent upon the rate of the alternative conduction of the transistors 20 and 30, which is controlled by the input circuit 70, in turn controlled by the feedback circuit 74. The input circuit 70 is shown as a push-pull circuit to control the push-pull output circuit 72.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

A transistor motor circuit comprising, in combination, a shaded pole squirrel cage induction motor having a first center tapped field winding, a second control winding on said motor, first and second PNP transistors each having base, collector and emitter electrodes, means connecting together the emitters of said transistors, a D.C. source connected between said center tap and the junction of said emitters, means connecting said collectors to the end connections of said first winding to establish a push-pull load circuit, first and second resistors interconnecting the base electrodes of said transistors, a third resistor connecting the junction of said first and second resistors to said center tap, a fourth resistor connecting the junction of said first and second resistors with the junction of said emitters, a variable inductor and a capacitor connected in series with said second winding across said base electrodes for a control circuit for said transistors, the series combination of said second winding with said inductor and capacitor being series resonant at an operating frequency, and the shaded poles of said induction motor establishing starting torque and said induction motor operating at a speed determined by said resonant frequency minus the slip frequency.

References Cited in the file of this patent

UNITED STATES PATENTS

| | | |
|---|---|---|
| 2,786,972 | Dreier et al. | Mar. 26, 1957 |
| 2,796,571 | Dunn | June 18, 1957 |
| 2,810,843 | Grandvist | Oct. 22, 1957 |
| 2,814,769 | Williams | Nov. 26, 1957 |